United States Patent
Kim et al.

(10) Patent No.: US 10,535,905 B2
(45) Date of Patent: Jan. 14, 2020

(54) COOLING DEVICE AND BATTERY MODULE HAVING THE SAME

(71) Applicants: Hyundai Motor Company, Seoul (KR); Kia Motors Corporation, Seoul (KR)

(72) Inventors: Dal Kim, Gyeonggi-do (KR); Yoon Cheol Jeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 100 days.

(21) Appl. No.: 15/833,137

(22) Filed: Dec. 6, 2017

(65) Prior Publication Data

US 2019/0115637 A1 Apr. 18, 2019

(30) Foreign Application Priority Data

Oct. 18, 2017 (KR) .................. 10-2017-0135106

(51) Int. Cl.
| | |
|---|---|
| *H01M 10/613* | (2014.01) |
| *H01M 10/6554* | (2014.01) |
| *B60K 1/04* | (2019.01) |
| *H01M 10/625* | (2014.01) |
| *B60K 11/02* | (2006.01) |
| *H01M 2/10* | (2006.01) |
| *B60K 1/00* | (2006.01) |
| *H01M 10/656* | (2014.01) |

(52) U.S. Cl.
CPC .............. *H01M 10/613* (2015.04); *B60K 1/04* (2013.01); *B60K 11/02* (2013.01); *H01M 2/1083* (2013.01); *H01M 10/625* (2015.04); *H01M 10/6554* (2015.04); *B60K 2001/005* (2013.01); *H01M 10/656* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 2006/0141348 A1* | 6/2006 | Wong | H01M 2/105 429/120 |
| 2009/0325051 A1* | 12/2009 | Niedzwiecki | F28F 9/0275 429/120 |
| 2013/0130074 A1* | 5/2013 | Timmons | B60L 3/0046 429/62 |

FOREIGN PATENT DOCUMENTS

KR 2017-0019770 A 2/2017

\* cited by examiner

*Primary Examiner* — Wojciech Haske
(74) *Attorney, Agent, or Firm* — Mintz Levin Cohn Ferris Glovsky and Popeo, P.C.; Peter F. Corless

(57) ABSTRACT

A cooling device, which cools a battery by effectively dissipating heat generated from the battery, which is used, for example, in eco-friendly vehicles, is provided to increase the rate of battery charging and the reliability of the battery. The cooling device includes a pair of coolant pipes that introduce and discharge a coolant and a cooling channel that connects the coolant pipes to each other to move the coolant from a first coolant pipe to a second coolant pipe. Additionally, a heat transfer plate is coupled to the cooling channel and has a contact surface configured to be in surface contact with a heat-emitting element.

12 Claims, 4 Drawing Sheets

COOLING DEVICE AND BATTERY MODULE HAVING THE SAME

CROSS-REFERENCE TO RELATED APPLICATION

This application claims the priority benefit of Korean Patent Application No. 10-2017-0135106, filed on Oct. 18, 2017, the disclosure of which is incorporated herein by reference.

BACKGROUND

1. Field of the Invention

The present invention relates to a battery cooling device and a battery module having the same, and more particularly, to a cooling device, which cools a battery by effectively dissipating heat generated from the battery, which is used, for example, in eco-friendly vehicles, thereby increasing the rate of battery charging and the reliability of the battery, and a battery module having the same.

2. Description of the Related Art

Research and development and technical advancements related to eco-friendly vehicles, which produce the power of a vehicle by driving a motor using electric energy, is being conducted due to the influence of environmental regulations and exhaustion of fossil fuels worldwide. Eco-friendly vehicles using electric energy cause minimal pollution, but suffer from a reduced travel distance range due to the limitation of the energy storage capacity of a battery, which may store electric energy therein. Therefore, it is advantageous to mount a maximum number of batteries in the vehicle. Accordingly, the volume density of batteries provided in the eco-friendly vehicle is increasing.

Thus, instead of a conventional air-cooling method, which has been applied to control battery heat emission, a water-cooling method has recently been applied to realize efficient cooling in the reduced space that remains after the space that would otherwise be used for air circulation is filled with batteries. In particular, the water-cooling method has high efficiency in terms of an increase in vehicle output and a reduction in the charging time of electric energy.

A water-cooling-type battery cooling method has conventionally been applied, in which a heat sink is disposed between battery cells and a cooling channel for the flow of cooling water is disposed below the battery cells to remove heat transferred through the heat sink, which is in contact with the battery cells, via the cooling channel. In the conventional water-cooling-type battery cooling method, it is necessary to use a thermal interface material between the heat sink and the cooling channel for the purpose of heat transfer, but a low-price thermal interface material having low thermal conductivity has typically been used in consideration of battery production costs. Although there are thermal interface materials having high thermal conductivity, such materials may excessively increase battery manufacturing costs, causing deterioration in economic efficiency.

SUMMARY

The present invention provides a cooling device, which is capable of cooling a battery by effectively dissipating heat generated from the battery, which is used, for example, in eco-friendly vehicles, and a battery module having the same.

In particular, an object of the present invention is to provide a cooling device, which is capable of effectively dissipating heat, which is rapidly generated in a battery when a substantial amount of charge current is introduced into the battery to increase the rate of battery charging, and a battery module having the same.

In accordance with one aspect of the present invention, a cooling device may include a pair of coolant pipes for introduction and discharge of coolant, a cooling channel configured to connect the coolant pipes to each other to move the coolant from one coolant pipe to a remaining coolant pipe, and a heat transfer plate coupled to the cooling channel and having a contact surface configured to be in surface contact with a heat-emitting element. In an exemplary embodiment of the present invention, the heat transfer plate may be coupled to the cooling channel with one end thereof surrounding the cooling channel. In addition, the heat transfer plate may be a heat pipe and may be welded to the cooling channel.

In accordance with another aspect of the present invention, a battery module may include a plurality of stacked battery cells and at least one cooling device disposed between neighboring battery cells among the plurality of battery cells. The cooling device may include a pair of coolant pipes for introduction and discharge of coolant, a cooling channel configured to connect the coolant pipes to each other to move the coolant from one coolant pipe to a remaining coolant pipe, and a heat transfer plate coupled to the cooling channel and having opposite contact surfaces configured to be in surface contact with the neighboring battery cells respectively.

In an exemplary embodiment of the present invention, the heat transfer plate may be coupled to the cooling channel with one end thereof surrounding the cooling channel. In addition, the heat transfer plate may be a heat pipe and may be welded to the cooling channel. The at least one cooling device may include a plurality of cooling devices, and the pair of coolant pipes of the respective cooling devices may be connected to communicate with each other. In addition, the battery module may further include a pair of end plates disposed respectively on outermost positions in a direction in which the battery cells are stacked, and a plurality of covers fastened to the end plates to surround a structure comprising the battery cells and the cooling device.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a cooling device and a battery module having the same according to various exemplary embodiments of the present invention will be described in detail with reference to the accompanying drawings.

Figure 1:
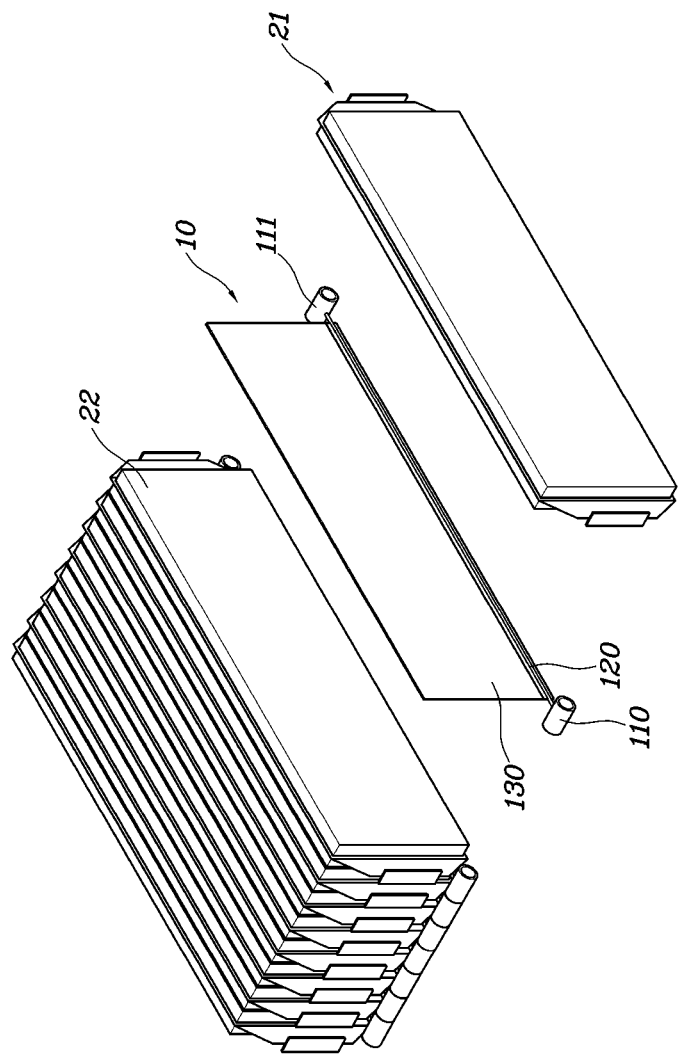
FIG. 1 is a perspective view illustrating a cooling device and a battery module having the same according to an exemplary embodiment of the present invention.
Figure 2:
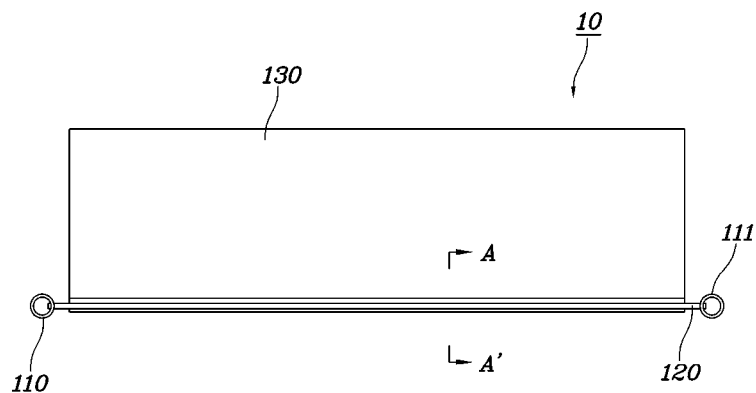
FIG. 2 is a front view illustrating the cooling device according to an exemplary embodiment of the present invention.
Figure 3:
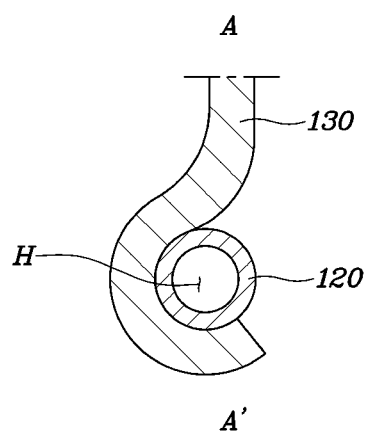
FIG. 3 is a cross-sectional view taken along line A-A' of FIG. 2 according to an exemplary embodiment of the present invention.

FIG. 1 is a perspective view illustrating a cooling device and a battery module having the same according to an exemplary embodiment of the present invention, FIG. 2 is a front view illustrating the cooling device according to an exemplary embodiment of the present invention, and FIG. 3 is a cross-sectional view taken along line A-A' of FIG. 2.

Referring to FIGS. 1 to 3, the cooling device according to an exemplary embodiment of the present invention, designated by reference numeral 10, may include a pair of coolant pipes 110 and 111, a cooling channel 120, and a heat transfer plate 130. In addition, the battery module according to an exemplary embodiment of the present invention may include the cooling device 10 described above and a plurality of battery cells 21 and 22, which are in surface contact with the heat transfer plate 130 of the cooling device 10.

The coolant pipes 110 and 111 may be configured to supply and discharge coolant (e.g. cooling water), which flows through the cooling channel 120. For convenience of description, the coolant pipe 110 into which the coolant is introduced is referred to as a first coolant pipe, and the coolant pipe 111 from which the coolant is discharged is referred to as a second coolant pipe. The cooling channel 120 is a type of pipe having an aperture H, through which the coolant flows to introduce the coolant thereinto from the first coolant pipe 110 and then the coolant may be transferred therefrom to the second coolant pipe 111. A first end of the cooling channel 120 may be disposed inside the first coolant pipe 110 and a second end of the cooling channel 120 may be disposed inside the second coolant pipe 111.

The cooling channel 120 is an element in which heat transferred from heat-emitting elements (e.g., the battery cells 21 and 22) may be dissipated via heat exchange with the coolant. To transfer the heat to the cooling channel 120, in an exemplary embodiment of the present invention, the heat transfer plate 130 may be provided. The heat transfer plate 130 is an element having opposite surfaces capable of being in surface contact with the battery cells 21 and 22, which are heat-emitting elements. The heat transfer plate 130 may be formed of a material having excellent thermal conductivity. In particular, in the present invention, the heat transfer plate 130 may be a heat pipe to increase cooling performance. The heat pipe is a structure that encloses a volatile liquid in the inner space thereof. When heat is generated in a first end of the structure, the liquid therein may evaporate to cause the resulting gas to move to a second end of the structure by way of the center portion of the structure.

The gas moved to the second end may be cooled and condensed to liquid, and thereafter, the liquid may again be moved to first end of the structure by capillary force through cut grooves, acting as wicks, formed in the inner space of the structure. The main body of the heat pipe may be formed of, for example, cooper, stainless-steel, ceramics, or tungsten, and for example, porous fibers (e.g. graphite) are used inside the heat pipe. However, the present invention is not limited thereto and other known materials may be used. In addition, the volatile liquid inside the heat pipe may be, for example, methanol, acetone, water, or mercury. The heat pipe described above may be configured to transfer heat via change in the phase of the liquid, and therefore, may realize much higher thermal conductivity than a metal having the same volume.

In an exemplary embodiment of the present invention, a first end of the heat transfer plate 130 may be coupled to the cooling channel 120 to surround the cooling channel 120. Accordingly, the contact area between the heat transfer plate 130 and the cooling channel 120 may be maximized. In particular, in an exemplary embodiment of the present invention, the heat transfer plate 130 and the cooling channel 120 may be coupled to each other via welding. For example, the heat transfer plate 130 and the cooling channel 120 may be directly bonded to each other using a welding method such as brazing. However, the present invention is not limited thereto and other known method of coupling may be used.

As previously described above, a conventional battery water-cooling system includes a battery module that is provided separately from a cooling channel and is in contact with the top of the cooling channel to be cooled by the cooling channel. In the conventional battery water-cooling system, the battery module includes a plurality of stacked battery cells stacked and a cooling plate between the neighboring battery cells, and the cooling plate extends to the bottom of the battery module to be in contact with the cooling channel.

Additionally, in the conventional battery water-cooling system, since bonding between the cooling plate and the cooling channel is impossible, a thermal interface material (TIM) is applied to the contact area therebetween. However, when it is difficult to use a high-priced thermal interface material having high thermal conductivity due to economic reasons, such as an increase in manufacturing costs, the conventional battery water-cooling system suffers from remarkable reduction in cooling efficiency due to the thermal interface material having low thermal conductivity.

However, since the battery cooling device according to several exemplary embodiments of the present invention may include the heat transfer plate in contact with one cooling channel, the heat transfer plate and the cooling channel may be directly bonded to each other via, for example, welding. Therefore, the cooling device according to several exemplary embodiments of the present invention uses no thermal interface material (e.g., omits the requirement of a thermal interface material), typically having low thermal conductivity, between the heat transfer plate and the cooling channel, and therefore, may realize heat transfer without deterioration in heat transfer efficiency caused by poor thermal conductivity.

In particular, as described above, in an exemplary embodiment of the present invention, the heat transfer plate may be a heat pipe having excellent heat transfer efficiency. For example, since the thermal conductivity of aluminum is about 237 W/m·k, whereas the heat pipe has a thermal conductivity of approximately 4000 W/m·k, the heat pipe may achieve increased cooling performance of substantially 20 times that of an aluminum plate. However, in the conventional battery water-cooling system, since the thermal interface material having low thermal conductivity of 2 W/m·k is used, a minimal amount of heat may be transferred to the cooling channel even when the heat pipe is applied, and thus improved cooling effects may not be achieved.

However, in an exemplary embodiment of the present invention, since the cooling channel 120, through which the coolant flows, may be directly bonded to the heat transfer plate 130 having the form of a heat pipe, it may be possible to prevent deterioration in heat transfer efficiency due to the thermal interface material and to maximize the effects acquired by the excellent thermal conductivity of the heat pipe. Meanwhile, the coolant pipes 110 and 111 may be formed of a plastic material and may be bonded to the cooling channel 120 via, for example, insert-welding.

Figure 4:
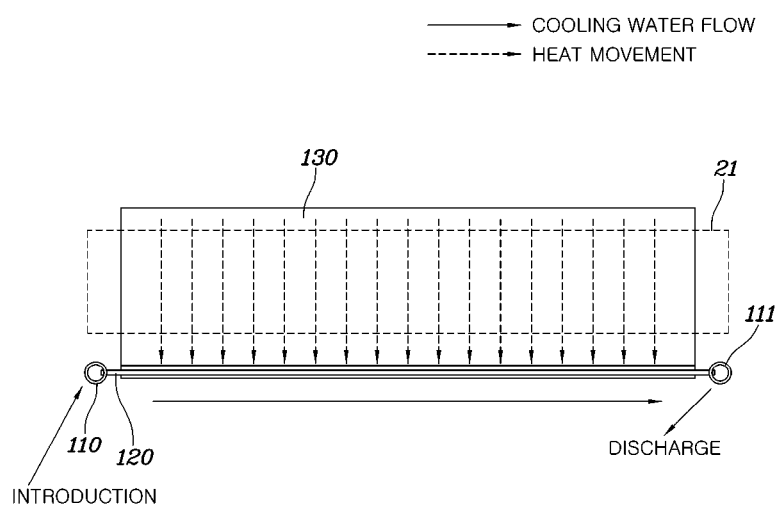
FIG. 4 is a view illustrating the cooling operation of the cooling device according to an exemplary embodiment of the present invention.

FIG. 4 is a view illustrating the cooling operation of the cooling device according to an exemplary embodiment of the present invention. As illustrated in FIG. 4, the battery cell or the heat-emitting element 21 of the battery cell may be disposed to be in surface contact with the heat transfer plate 130. Of course, although not illustrated in FIG. 4, another battery cell may be in surface contact with the other surface of the heat transfer plate 130.

When heat is transferred from the battery cell 21, which is in surface contact with the heat transfer plate 130, the heat transfer plate 130 transfers the heat to the area in which the heat transfer plate 130 is bonded to the cooling channel 120. The coolant (cooling water) may be introduced from the outside to the first coolant pipe 110 and some of the introduced coolant passes through the cooling channel 120 to be directed to the second coolant pipe 111. Through heat exchange occurring in the cooling channel 120 in which the low-temperature coolant flows, the heat transferred from the heat transfer plate 130 may be dissipated.

In particular, when the heat transfer plate 130 is a heat pipe, as the heat emitted from the battery cell 21 is transferred to the heat transfer plate 130, the liquid inside the heat transfer plate 130 may be changed in phase to gas via evaporation. The resulting gas may transfer the heat while moving downward to the cooling channel 120 in which the low-temperature coolant flows. The gas moved from the inside of the heat transfer plate 130 to the cooling channel 120 may be reduced in temperature by the coolant flowing in the cooling channel 120 and may again be changed in phase to liquid. The phase-changed liquid may be moved to the top of the heat transfer plate 130 by capillary force through grooves, acting as wicks, formed in the heat transfer plate 130.

Figure 5:
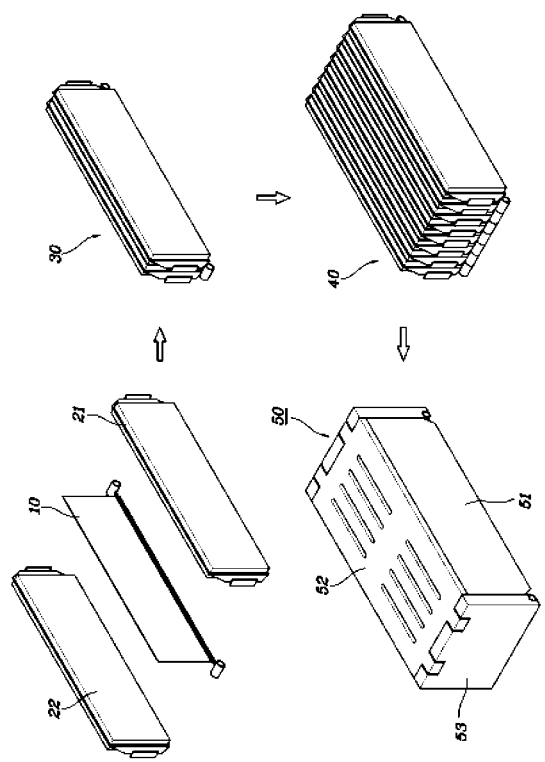
FIG. 5 is a view illustrating an exemplary process of manufacturing the battery module having the cooling device according to an exemplary embodiment of the present invention.

FIG. 5 is a view illustrating an exemplary process of manufacturing the battery module having the cooling device according to an exemplary embodiment of the present invention. According to several embodiments of the present invention, a battery module 40 or 50 having the cooling device 10 having the features described above may be provided. The battery module 50 may include the multiple battery cells 21 and 22 and the cooling device 10 disposed between the battery cells 21 and 22. First, the battery cells 21 and 22 and the cooling device 10 may be provided and assembled to each other so that one surface of the respective battery cells 21 and 22 and opposite surfaces of the heat transfer plate 130 of the cooling device 10 are in surface contact with each other. Therefore, a unit module 30 having two battery cells 21 and 22 and one cooling device 10 may be manufactured.

The battery module 40 may be manufactured by stacking a plurality of unit modules 30 in a particular direction. The coolant pipes 110 and 111 of the cooling device 10 provided in one unit module 30 may be coupled to the coolant pipes 110 and 111 of the cooling devices 10 provided in neighboring unit modules 30 to communicate with each other. In another example, when the cooling device 10 is further disposed between the neighboring unit modules 30 when the unit modules 30 are stacked, the coolant pipes 110 and 111 of the cooling device 10 may be coupled to the coolant pipes 110 and 111 of the closest cooling devices 10 at the front and rear sides thereof in the stacking direction to communicate with each other.

As a method of coupling the neighboring coolant pipes 110 and 111 to each other, techniques known in the art, such as adhesive bonding or mechanical fitting structures, may be applied. The structure 40 realized by stacking the multiple unit modules 30 or the structure having an additional cooling device between the stacked unit modules 30 may be completed as the final battery module 50 by encasing the same. For example, the battery module 50 may enclose the structure 40 using a pair of end plates 51, which may be disposed at the outermost positions in the direction in which the unit modules 30 or the battery cells are stacked, and covers 52 and 53, which may be disposed on the other surfaces of the stacked structure 40, on which the end plates 51 are not disposed. In the casing structure, the coolant pipe disposed at the outermost position in the stacked structure 40 may be exposed outward from the casing structure to receive the coolant from the outside and to discharge the coolant to the outside.

As is apparent from the above description, in a cooling device and a battery module having the same according to several exemplary embodiments of the present invention, a cooling channel in which coolant flows may be provided inside the battery module. With this structural feature, it may be possible to remove a thermal interface material for thermal contact between the cooling channel and a heat transfer plate, which transfers heat generated in battery cells inside the battery module to the cooling channel and to allow the heat transfer plate and the cooling channel to be directly bonded to each other, which may result in remarkably increased heat transfer efficiency.

In addition, according to the present invention, since the heat transfer plate and the cooling channel may be directly bonded to each other, when the heat transfer plate is a heat pipe, the excellent thermal conductivity of the heat pipe may be sufficiently utilized, which may further increase battery cooling efficiency. In addition, according to the present invention, since the battery may be sufficiently cooled even when the magnitude of charge current, which has a great effect on the emission of heat from the battery during charging, is increased, the charging time of the battery may be reduced, which may substantially increase the merchantability of eco-friendly vehicles.

Although the exemplary embodiments of the present invention have been described above with reference to the accompanying drawings, those skilled in the art will appreciate that the present invention can be implemented in various other exemplary embodiments without changing the technical ideas or features thereof.

What is claimed is:

1. A cooling device, comprising:
   a pair of coolant pipes for introduction and discharge of a coolant;
   a cooling channel configured to connect the coolant pipes to each other to move the coolant from a first coolant pipe of the coolant pipes to a second coolant pipe of the coolant pipes; and
   a heat transfer plate coupled to the cooling channel and having a contact surface configured to be in surface contact with a heat-emitting element,
   wherein the heat transfer plate is coupled to the cooling channel with one end thereof surrounding the cooling channel.

2. The cooling device according to claim 1, wherein the heat transfer plate is a heat pipe.

3. The cooling device according to claim 2, wherein the heat transfer plate is welded to the cooling channel.

4. The cooling device according to claim 1, wherein the heat transfer plate is welded to the cooling channel.

5. The cooling device according to claim 1, wherein the heat transfer plate is welded to the cooling channel.

6. A battery module, comprising:
   a plurality of stacked battery cells; and
   at least one cooling device disposed between neighboring battery cells among the plurality of battery cells,
   wherein the cooling device includes:
      a pair of coolant pipes for introduction and discharge of coolant;
      a cooling channel configured to connect the coolant pipes to each other to move the coolant from a first coolant pipe of the coolant pipes to a second coolant pipe of the coolant pipes; and
      a heat transfer plate coupled to the cooling channel and having opposite contact surfaces configured to be in surface contact with the neighboring battery cells respectively,
      wherein the heat transfer plate is coupled to the cooling channel with one end thereof surrounding the cooling channel.

7. The battery module according to claim 6, wherein the heat transfer plate is a heat pipe.

8. The battery module according to claim 7, wherein the heat transfer plate is welded to the cooling channel.

9. The battery module according to claim 6, wherein the heat transfer plate is welded to the cooling channel.

10. The battery module according to claim 6, wherein the heat transfer plate is welded to the cooling channel.

11. The battery module according to claim 6, wherein the at least one cooling device includes a plurality of cooling devices, and the pair of coolant pipes of the respective cooling devices are connected to communicate with each other.

12. The battery module according to claim 6, further comprising:
    a pair of end plates disposed respectively on outermost positions in a direction in which the battery cells are stacked; and
    a plurality of covers fastened to the end plates to surround a structure comprising the battery cells and the cooling device.

* * * * *